(12) United States Patent
Mountford-Lister

(10) Patent No.: US 11,932,073 B2
(45) Date of Patent: Mar. 19, 2024

(54) TELEHANDLER AND METHOD

(71) Applicant: Caterpillar Inc., Peoria, IL (US)

(72) Inventor: Timothy Jonathan Mountford-Lister, Desford (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/873,312

(22) Filed: Jul. 26, 2022

(65) Prior Publication Data
US 2023/0036670 A1 Feb. 2, 2023

(30) Foreign Application Priority Data

Jul. 27, 2021 (GB) .................................... 2110768

(51) Int. Cl.
| | | |
|---|---|---|
| *B60G 17/0165* | (2006.01) | |
| *B60G 9/02* | (2006.01) | |
| *B66F 9/065* | (2006.01) | |
| *B66F 9/075* | (2006.01) | |

(Continued)

(52) U.S. Cl.
CPC ...... *B60G 17/0165* (2013.01); *B60G 2300/02* (2013.01); *B60G 2400/051* (2013.01); *B60G 2400/204* (2013.01)

(58) Field of Classification Search
CPC .............. B60G 17/016; B60G 17/0165; B60G 2300/02; B60G 2400/051; B60G 2400/0511; B60G 2400/204; B60G 2200/322; B60G 2401/28; B60G 2800/0194; B60G 2202/40; B60G 2600/20; B60G 2800/012; B60G 9/02;

(Continued)

(56) References Cited

U.S. PATENT DOCUMENTS

| | | |
|---|---|---|
| 6,273,203 B1 | 8/2001 | Paggi et al. |
| 6,725,142 B2 | 4/2004 | Koch |
| 8,145,392 B2 | 3/2012 | Kim et al. |

(Continued)

FOREIGN PATENT DOCUMENTS

| | | |
|---|---|---|
| CN | 109895580 A | 6/2019 |
| DE | 3632416 C2 | 2/1991 |

(Continued)

OTHER PUBLICATIONS

United Kingdom Search Report related to Application No. GB2110768.5 reported on Jan. 24, 2022.

(Continued)

*Primary Examiner* — Jason D Shanske
*Assistant Examiner* — Daniel M. Keck

(57) ABSTRACT

A telehandler comprising: a chassis; an axle supporting the chassis; a pivotal connection between the axle and the chassis; and a chassis positioning system. The pivotal connection is configured to enable rotation of the chassis relative to the axle for varying a chassis-axle tilt angle defined between a longitudinal axis of the axle and the chassis. The chassis positioning system comprises: a chassis angle sensor configured to measure an angular position of the chassis relative to gravity; an actuator configured to rotate the chassis relative to the axle at the pivotal connection; and a control system configured, in a first mode, to control the actuator to thereby control the chassis-axle tilt angle based on the measured angular position of the chassis.

14 Claims, 3 Drawing Sheets

(51) Int. Cl.
*B66F 11/04* (2006.01)
*B66F 17/00* (2006.01)

(58) Field of Classification Search
CPC .... B66F 9/0755; B66F 9/0655; B66F 11/046; B66F 9/07559; B66F 17/00; B66F 17/003
See application file for complete search history.

(56) References Cited

U.S. PATENT DOCUMENTS

| | | | |
|---|---|---|---|
| 8,180,532 B2 | 5/2012 | O'Halloran et al. | |
| 9,227,478 B2 | 1/2016 | Horstman | |
| 10,375,890 B2 | 8/2019 | Ramp | |
| 10,442,461 B2 | 10/2019 | Kuriyagawa et al. | |
| 11,565,920 B2* | 1/2023 | Hao | B66F 13/00 |
| 2002/0093153 A1 | 7/2002 | Scotese et al. | |
| 2012/0321422 A1 | 12/2012 | Borghi | |
| 2015/0165856 A1* | 6/2015 | Horstman | B60G 21/007 |
| | | | 280/6.154 |
| 2017/0291802 A1 | 10/2017 | Hao | |
| 2018/0148089 A1* | 5/2018 | Kuriyagawa | B60K 7/0007 |
| 2020/0317486 A1 | 10/2020 | Puszkiewicz et al. | |
| 2021/0008945 A1 | 1/2021 | Perrin | |
| 2021/0061046 A1 | 3/2021 | Simon et al. | |
| 2021/0070595 A1 | 3/2021 | Holmes et al. | |
| 2021/0179406 A1* | 6/2021 | Chaillou | B66F 9/0655 |
| 2021/0300744 A1* | 9/2021 | Bailey | E02F 9/085 |

FOREIGN PATENT DOCUMENTS

| | | | | |
|---|---|---|---|---|
| GB | 2390065 A | * | 12/2003 | A61G 5/045 |
| GB | 2593723 A | | 10/2021 | |
| JP | 05139132 A | | 6/1993 | |
| KR | 102182120 B1 | | 11/2020 | |

OTHER PUBLICATIONS

GB Search and Examination Report for UK Patent Appln. No. 2110768.5, dated Oct. 30, 2023 (5 pgs).

* cited by examiner

TELEHANDLER AND METHOD

CROSS-REFERENCE TO RELATED APPLICATION

This application claims priority under 35 USC § 119 and the Paris Convention to Great Britain Application No. 2110768.5 filed on Jul. 27, 2021.

TECHNICAL FIELD

This disclosure is directed towards a telehandler machine comprising a chassis positioning system and a method of operating such a machine.

BACKGROUND

A telehandler (also called a telescopic handler) is a wheeled machine comprising an extensible telescopic boom for handling and moving loads. Telehandlers are often used to place or transport heavy loads and may be used on uneven terrain, for example in agricultural or construction environments. A tool is provided at the end of the boom for materials handling, for example a bucket, fork or similar. The extensible telescopic boom is rotatable or pivotable relative to a chassis of the telehandler machine. The position of the load held by the tool is therefore variable relative to the chassis. This can affect the centre of gravity and therefore the stability of the telehandler when positioned on or travelling over uneven terrain.

Manual chassis levelling, wherein the operator adjusts the position of the chassis to level it or position it at a required angle while collecting, depositing or transporting a load, may be slow. Using manual levelling the chassis can be levelled for collecting and depositing loads, but the load cannot be reliably kept level while the machine is being moved to transport a load over uneven terrain. The ability of the telehandler to transport loads reliably or effectively is therefore reduced.

SUMMARY

The present disclosure provides a telehandler comprising:
a chassis;
an axle supporting the chassis;
a pivotal connection between the axle and the chassis; and
a chassis positioning system;
wherein the pivotal connection is configured to enable rotation of the chassis relative to the axle for varying a chassis-axle tilt angle defined between a longitudinal axis of the axle and the chassis; and
wherein the chassis positioning system comprises:
a chassis angle sensor configured to measure an angular position of the chassis relative to gravity;
an actuator configured to rotate the chassis relative to the axle at the pivotal connection; and
a control system configured, in a first mode, to control the actuator to thereby control the chassis-axle tilt angle based on the measured angular position of the chassis.

The present disclosure further provides a method of controlling an angular position of a chassis of a telehandler, the telehandler comprising:
a chassis;
an axle supporting the chassis;
a pivotal connection between the axle and the chassis; and
a chassis positioning system;
wherein the pivotal connection is configured to enable rotation of the chassis relative to the axle for varying a chassis-axle tilt angle defined between a longitudinal axis of the axle and the chassis; and
wherein the chassis positioning system comprises:
a chassis angle sensor configured to measure an angular position of the chassis relative to gravity; and
an actuator configured to rotate the chassis relative to the axle at the pivotal connection;
the method comprising:
measuring the angular position of the chassis using the chassis angle sensor; and
controlling the actuator in a first mode to thereby control the chassis-axle tilt angle based on the measured angular position of the chassis.

By way of example only, embodiments according to the present disclosure are now described with reference to, and as shown in, the accompanying drawings.

DETAILED DESCRIPTION

The present disclosure is generally directed towards a telehandler and a method of controlling an angular position of a chassis of the telehandler to keep the chassis level, at a desired angle and/or stable while the telehandler is collecting, depositing, or transporting any loads, particularly over or on uneven terrain.

Figure 1:
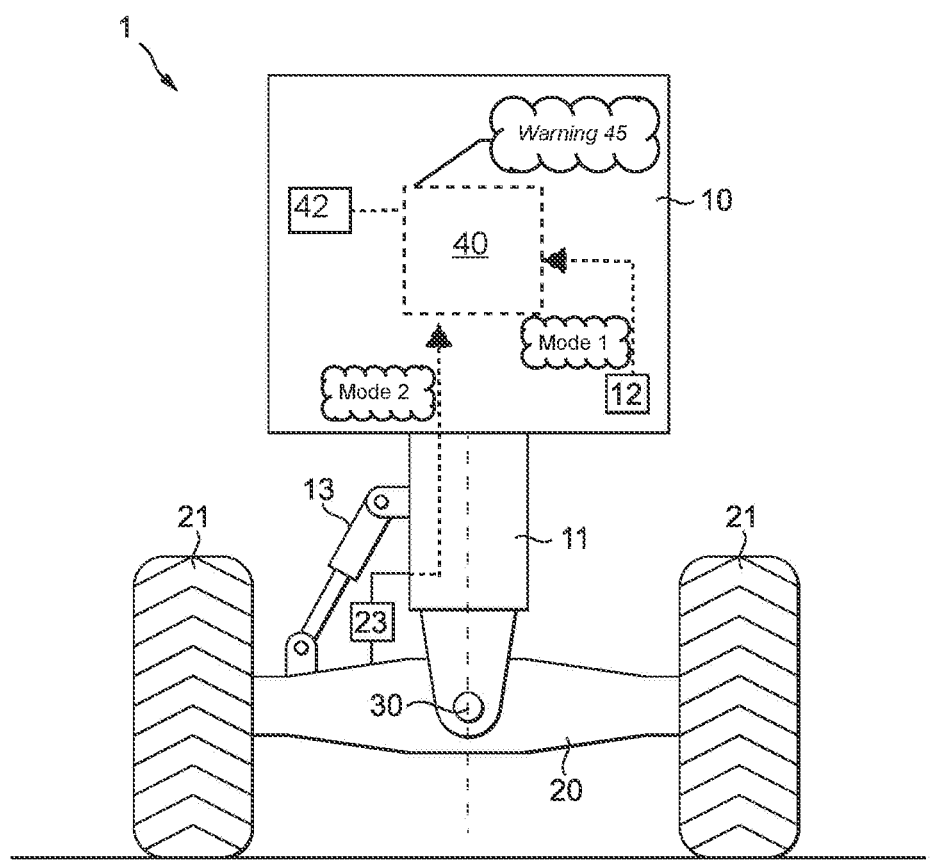
FIG. 1 is a schematic illustration of a telehandler according to the present disclosure on level ground.
Figure 2:
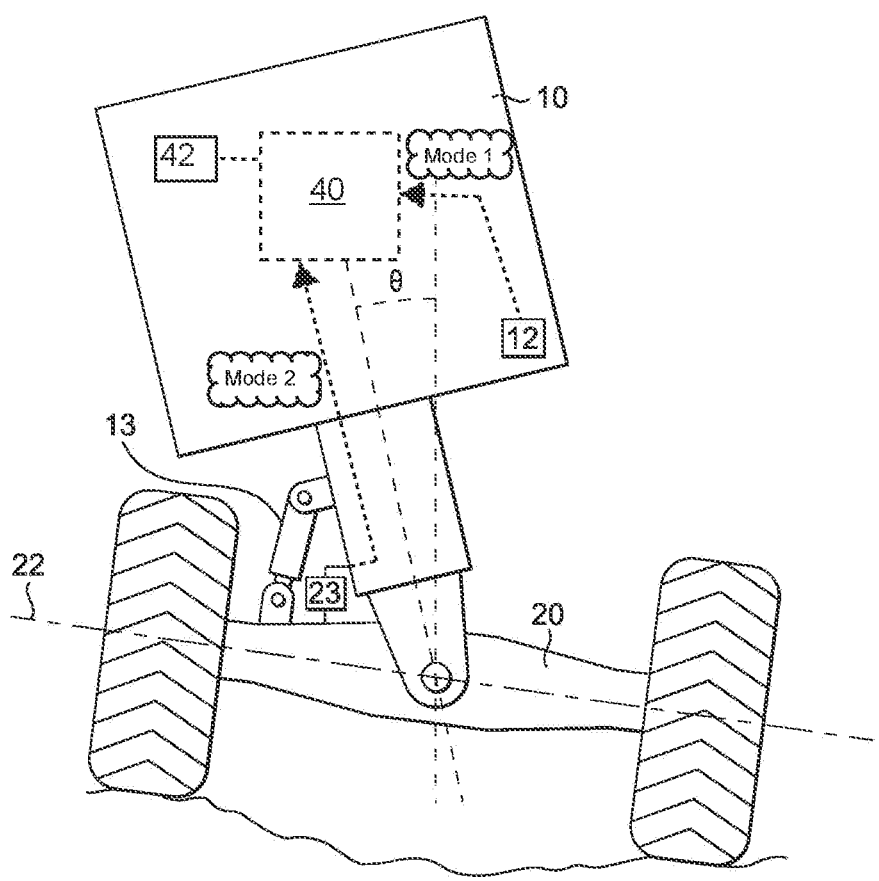
FIG. 2 is a schematic illustration of the telehandler of FIG. 1 on uneven ground during levelling.
Figure 3:
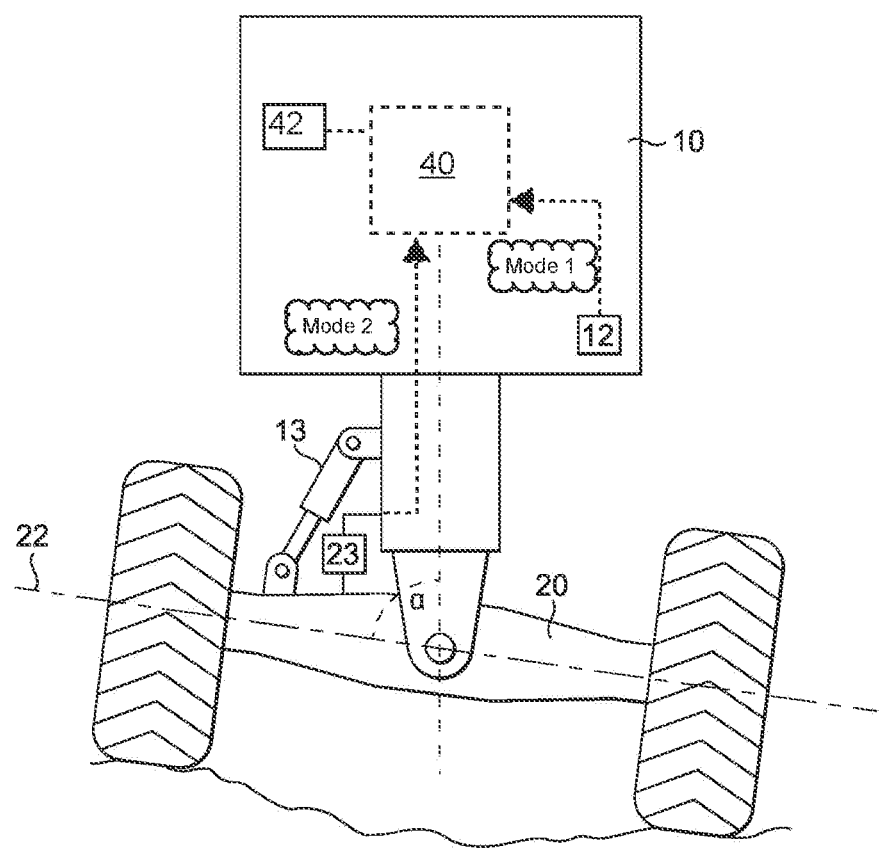
FIG. 3 is a schematic illustration of the telehandler of FIG. 1 on uneven ground with the chassis in a horizontal position with respect to gravity.

FIGS. 1 to 3 schematically illustrate a telehandler 1 according to the present disclosure. The telehandler 1 comprises a chassis 10, an axle 20 supporting the chassis 10, a pivotal connection 30 between the axle 20 and the chassis 10.

The axle 20 may extend laterally across the telehandler 1 and may have a wheel 21 arranged at each end. The axle 20 may be arranged in any axle position of the telehandler 1, for example the axle 30 may be a front, rear or middle axle. The wheels 21 may be drive wheels for moving the telehandler 1, or may be non-drive wheels supporting the weight of the telehandler (e.g. the telehandler 1 may be two- or four-wheel drive). The telehandler 1 may comprise one or more further axles (not shown). The further axle(s) may also extend laterally across the telehandler 1 and with a wheel 21 arranged at each end. The axle 20 and/or any further axles may or may not be steerable axles (e.g. the telehandler 1 may be two- or four-wheel steer).

The chassis 10 may comprise a frame 11 for connection to the axle 20 via the pivotal connection 30. The chassis 10 may comprise a cab and a telescopic boom (not shown). The frame 11 may be rigidly connected to the other components of the chassis 10 such that an orientation angle of the frame 11 with respect to gravity may be considered to be equal to orientation angle of the chassis 10 with respect to gravity. The boom may be extendable and may be pivotable relative to the frame 11 about one or more pivot axes. A pivotable tool connector may be provided at an end of the boom distal to the chassis 10 for attachment of a tool, for example a bucket, fork or similar.

The pivotal connection 30 is configured to enable rotation of the chassis 10 relative to the axle 20 for varying a chassis-axle tilt angle α defined between a longitudinal axis 22 of the axle 20 and the chassis 10.

The pivotal connection 30 may be configured to allow rotation of the axle 20 about a longitudinal axis of the telehandler 1, hence allowing the roll angle of the chassis 10 to be adjusted. The pivotal connection 30 may be arranged to such that the pivot is at a centre point of the axle 20 as measured along its longitudinal axis 22. The pivotal connection 30 may comprise one or more bearings fixedly attached to the frame 11 and rotatable about a projection extending from the axle 20. Alternatively, the pivotal connection 30 may comprise one or more bearings fixedly attached a body of the axle 20 and rotatable about a pin mounted to the frame 11.

The chassis-axle tilt angle α may be defined as the angle of rotation (i.e. roll angle) of the chassis 10 relative to the longitudinal axis 22 of the axle 20 about the longitudinal axis of the telehandler 1, the longitudinal axis of the telehandler 1 being arranged generally from front to back of the telehandler 1 in a usual straight-line direction of travel. Such a longitudinal axis of the telehandler 1 may therefore be the pivot axis of the pivotal connection 30. The chassis-axle tilt angle α may be defined, for example, between the longitudinal axis of the axle 22 and an axis defined with respect to the chassis 10 or the frame 11, or between the longitudinal axis of the axle 22 and a fixed geometric feature of the chassis 10 or the frame 11.

The telehandler 1 also comprises a chassis positioning system comprising a chassis angle sensor 12 configured to measure an angular position θ of the chassis 10 relative to gravity.

The angular position θ may therefore be defined as the angle of rotation (i.e. a roll angle) of the chassis 10 relative to gravity (i.e. relative to a vertical axis generally aligned with the direction of gravity). The chassis angle sensor 12 may comprise an inertial measurement unit (IMU), for example a gyroscope, accelerometer etc.

The chassis positioning system comprises an actuator 13 configured to rotate the chassis 10 relative to the axle 20 at the pivotal connection 30. The actuator 13 may be an extensible member attached at a first end to the chassis 10 and at a second end to the axle 20 at a point spaced from the pivotal connection 30 such that extension or retraction of the actuator 13 results in rotation of the chassis 10 relative to the axle 20 about the pivotal connection 30. The actuator 13 may be an electro-hydraulically actuated cylinder.

The axle 20 may be configured linearly such that the parts of the axle 20 on either side of the pivotal connection 30 remain coaxial at all times (i.e. they are not pivotable relative to each other about the pivotal connection 30), such that a single actuator 13 arranged on one side of the pivotal connection 30 may vary the angle of the whole axle 20 relative to the chassis 10.

The chassis positioning system may comprise a paired actuator (not shown) arranged on the other side of the chassis and connected to the axle 20 and chassis 10. The paired actuator may be configured in the same way as the actuator 13 and arranged in a mirrored position relative to the pivotal connection 30 such that the actuator 13 and the paired actuator work act together to rotate the axle 20.

Any further axle(s) of the telehandler 1 may have one or more further actuators 13 arranged as on the axle 20. The one or more further actuators 13 and any associated paired actuators may be controlled by the chassis levelling system in the same way as actuator 13. Where the further axle(s) are not controlled by the chassis levelling system, they may be pivotally connected to the frame and may be free to rotate within predefined limits about the pivot or may be fixable in position, for example for fixing their position during loading.

The chassis positioning system comprises a control system 40 configured, in a first mode, to control the actuator 13 to control the chassis-axles tilt angle α based on the measured angular position θ of the chassis 10. The control system 40 may be regarded as or include a controller. The first mode may therefore be a chassis-gravity control mode. The control system 40 may be configured in the first mode to control the chassis-axle tilt angle α based on the measured angular position θ of the chassis 10 to position the chassis 10 at a target angular position θ of the chassis 10.

The chassis positioning system may further comprise an axle position sensor 23. The axle position sensor 23 may output a value representative of the current chassis-axle tilt angle α. The control system 40 may thereby determine the current chassis-axle tilt angle α based on an output of the axle position sensor 23. The control system 40 may be configured, in a second mode, to control the actuator 13 to thereby control the chassis-axle tilt angle α based on the determined current chassis-axle tilt angle α. The second mode may therefore be a chassis-axle control mode. The control system 40 may be configured in the second mode to control the chassis-axle tilt angle α based on the determined current chassis-axle tilt angle α to position the chassis at a target chassis-axle tilt angle α.

Controlling the actuator 13 may comprise increasing, decreasing or maintaining the extension of the actuator to vary or maintain the chassis-axle tilt angle α. The control system may be configured to selectively operate in the first mode or the second mode.

The control system 40 may be configured to set the target angular position θ or the target chassis-axle tilt angle α of the chassis 10 based on an input 42 input from an operator of the telehandler 1. The control system 40 may comprise one or more controllers configured to allow the operator to:
  select when the chassis positioning system is active;
  select when the chassis positioning system operates in the first mode and/or the second mode;
  provide fine adjustment of the target angular position θ or the target chassis-axle tilt angle α of the chassis 10; and/or
  select pre-set values for the target angular position θ or the target chassis-axle tilt angle α of the chassis 10.

The control system may be configured to allow the operator to switch or toggle between pre-set values for the target angular position θ and/or target chassis-axle tilt angle α. A controller or controllers may be provided to input the target angular position θ and/or to input a target chassis-axle tilt angle α. The target angular position θ may be 0 degrees, to return the chassis 10 to a horizontal position. The target chassis-axle tilt angle α may be 90 degrees to return the chassis 10 to a position perpendicular to the axle. The controller or controllers may be configured to input the target angular position θ and/or the target chassis-axle tilt angle α with a single input (e.g. a single button push).

The axle position sensor 23 may comprise direct angle sensing apparatus (e.g hydraulic cylinder displacement sensor, electro-mechanical angle sensor etc.) coupled to the chassis 10 and the axle 20 and configured to directly measure the chassis-axle tilt angle α. The direct angle sensing apparatus may comprise, for example, a hydraulic cylinder displacement sensor or an electro-mechanical angle sensor. The axle position sensor 23 may comprise an actuator extension sensor, the control system being configured to determine the chassis-axle tilt angle $\alpha$ based on the output of the actuator extension sensor and a known geometry of the axle 20 and the chassis 10, for example the known fixed distances from the point of connection of the actuator 13 on the axle 20 to a pivot of the pivotal connection 30, and from the pivot of the pivotal connection 30 to the point of connection between the actuator 13 and the chassis 10.

The axle position sensor 23 may output a value representative of an exact current chassis-axle tilt angle $\alpha$. Alternatively, or in addition, the axle position sensor 23 may output a value indicating whether or not the axle 20 has reached, or is within a pre-set proximity of reaching, a predefined limit of rotation. The value output by the axle position sensor 23 may be used to trigger a warning 45 to an operator of the telehandler 1 to indicate that the chassis 10 has reached a positional limit of the axle 20 or of the control system 40.

A chassis-axle tilt angle range may be defined in the control system 40. The control system 40 may be configured to provide the warning 45 to an operator of the telehandler 1 when the determined current chassis-axle tilt angle $\alpha$ is outside the defined chassis-axle tilt angle range. The control system 40 may be configured to provide the warning 45 to the operator at extreme axle angles. The warning 45 may comprise audible and/or visual feedback. The warning may be provided when the control system 40 is operating in the first mode or the second mode.

The control system may continuously process data received from the chassis angle sensor 12 and/or the axle position sensor 23 while the chassis positioning system is in use. The control system may process the data received from the chassis angle sensor 12 and/or the axle position sensor 23, along with a target angle (target angular position $\theta$ or target chassis-axle tilt angle $\alpha$) and use control mathematics to calculate the required input to the actuator 13 to control the chassis-axle tilt angle $\alpha$ to move the chassis 10 to the target angle. The control mathematics may comprise a Proportional Integral Differential (PID) control loop.

The control system may use the target angle (target angular position $\theta$ or target chassis-axle tilt angle $\alpha$) as the set point for a feedback control loop calculation. The control system may use the difference between the target angle and the current angle (current angular position $\theta$ or current chassis-axle tilt angle $\alpha$), the error, as the input to the control loop calculation, which may then generate an appropriate output to minimise the error. This output from the control loop calculation may comprise a desired rate of change in chassis-axle tilt angle $\alpha$. The control system may then calculate a required rate of change in actuator extension to extend or retract the actuator 13 based on the geometry of the actuator 13, chassis 10 and axle 20 to provide the desired rate of change in chassis-axle tilt angle $\alpha$. The control system may then output a signal to extend or retract the actuator 13 as required. Where the actuator 13 is an electro-hydraulically actuated cylinder, the output may comprise a control signal to a control valve of the electro-hydraulically actuated cylinder to set a required flow rate and flow path or direction.

In the first mode, the control system may capture the current angular position $\theta$ of the chassis 10 with respect to gravity by reading the angle from the chassis angle sensor 12. The control system may compare an output of the chassis angle sensor 12 to a lookup table to obtain an angle value of the current angular position $\theta$ of the chassis 10. The current angular position $\theta$ of the chassis 10 may then be available for use by the control system as the feedback value in the control mathematics. The operator may use one or more controllers to set a target angular position $\theta$ of the chassis 10. The control system may be configured to continuously operate in the first mode during travel of the telehandler 1.

In the second mode, the control system may determine the current chassis-axle tilt angle $\alpha$ based on the output of the axle position sensor 23 as described above. The current chassis-axle tilt angle $\alpha$ may then be available for use by the control system as the feedback value in the control mathematics. The current chassis-axle tilt angle $\alpha$ may also be used by the control system to provide other functions such as selectively disabling the system or providing warning to the operator when a limit condition is reached. The operator may use one or more controllers to set a target chassis-axle tilt angle $\alpha$.

The control system may be configured to receive additional inputs from further sensor apparatus indicative of vehicle status and/or to receive operator inputs. Additional operator inputs may comprise, for example, an on/off signal for the chassis positioning system. Vehicle status may comprise, for example, vehicle speed, drive gear, position of one more stabilisers and/or sensor status. The control system may be configured to modify its output signal to tune the system based on the additional inputs or sensor inputs. For example, the control system may be configured to change the chassis-axle tilt angle $\alpha$ with a maximum specified rate. The maximum rate of change of the chassis-axle tilt angle $\alpha$ may be varied based on the additional inputs. The control system may limit the rate at which a target chassis-axle tilt angle $\alpha$ or target angular position $\theta$) can be changed by the operator based on one or more vehicle status inputs.

The control system may configured to automatically switch from the first mode to the second mode when machine state is outside predefined limits for operating in the first mode. Such machine states may comprise, for example, a telehandler travel speed exceeding a speed limit or the telehandler operating in a specified transmission gear. A maximum vehicle speed may be set based on a highest operational gear. The control system may be configured to automatically switch from the first mode to the second mode at a point defined based on the maximum operational gear The control system may be configured to initially maintain the current chassis-axle tilt angle $\alpha$ when automatically switching from the first mode to the second mode. The control system may be configured to maintain the chassis-axle tilt angle $\theta$ when switching from the second mode to the first mode The control system may be configured to provide a warning to the operator if the operator selects a mode which is not permitted based on the current machine state (i.e. when the current machine state is outside predefined limits for the selected mode).

The control system may be configured, in a third, manual mode, to control the actuator 13 to thereby control the chassis-axle tilt angle $\alpha$ based on an output from a controller. The controller may be a joystick, thumb roller or other variable input. In the third mode, the control system may control the actuator based on the controller signal, for example generating a defining a flow rate and flow path or direction based on the output, which may be a controller position. The third mode may be a fully manual control mode. The control system may be configured to operate in third mode if the first and second control modes are unavailable, for example if one or more sensors are non-functional.

The present disclosure also provides a method of controlling an angular position of the chassis 10 of the telehandler 1 according to the present disclosure. The method comprises measuring the angular position $\theta$ of the chassis 10 using the chassis angle sensor 12 and controlling the actuator 13 in a first mode to thereby control the chassis-axle tilt angle α based on the measured angular position θ of the chassis 10.

The method may further comprise determining a current chassis-axle tilt angle α based on an output of the axle position sensor 23, and controlling the actuator 13 in a second mode to thereby control the chassis-axle tilt angle α based on the determined current chassis-axle tilt angle α.

The method may comprise carrying out any or all of the steps described herein as being carried out by the control system. The skilled person will understand that any and/or all features of the disclosed method may be provided in the disclosed apparatus and vice versa. The skilled person will understand that the disclosed method is intended to be carried out using the described apparatus. The skilled person will understand that the disclosed method steps may be carried out in any technically feasible order and are not limited to the order described herein.

References to "angular position of the chassis" herein refer to the angular position of the chassis 10 relative to gravity (i.e. with respect to an axis substantially aligned with the direction of gravity). References to "horizontal" and "vertical" refer to directions defined with respect to gravity unless specified otherwise

INDUSTRIAL APPLICABILITY

The apparatus and method of the present disclosure provide a dynamic chassis levelling and anti-roll stability system for a telehandler carrying a load on uneven terrain. Due to the variability of the load position relative to the chassis in a telehandler, it may be of particular interest to avoid undesired changes in roll angle and/or rolling of a telehandler in use.

The disclosed telehandler and method may provide automatic adjustment of the chassis angle of the telehandler machine through automated control of the chassis position to account for uneven terrain when stationary or in motion. The disclosed telehandler and method may continuously adjust of chassis position in use to reliably keep the load level while the machine is being moved to transport loads over uneven terrain.

By directly measuring the angular position of the chassis relative to gravity and/or the chassis-axle tilt angle the disclosed telehandler and method may provide finer control of chassis position by the control system. These measurements may be less prone to signal noise and/or error than a measurement of angle with respect to the ground. Positioning a sensor of angular position with respect to gravity directly on the chassis, rather than on an axle, may reduce the number calculations required to determine the angular position of the chassis and/or may avoid the need to provide chassis-axle angle measurement for operation in the first mode. This may also limit possible sources of error in establishing the angular position of the chassis. By housing the sensor within the chassis, it may easier to mount and/or be less susceptible to damage in use.

By continuously measuring the chassis-axle tilt angle, the disclosed telehandler and method may allow for correction of any positional drift which may occur in the actuator over time, for example leakage which may occur over time when the axle is actuated by an electro-hydraulically actuated cylinder.

The actuators of the chassis levelling system may also be controlled manually and may therefore reduce the need for additional components as the same actuators may be used for manual and dynamic control.

By measuring the chassis-axle tilt angle directly, the disclosed telehandler and method may allow for reliable transition between modes, and for reliable response to operator inputs such as changing to a different pre-set target angle.

By measuring the chassis-axle tilt angle as well as the angular position of the chassis with respect to gravity, the disclosed telehandler and method may allow for provision of warnings to the operator when axle travel limits are reached and may therefore improve the safety of the system.

By measuring the chassis-axle tilt angle, rather than measuring the axle angle with respect to gravity, the disclosed telehandler and method may reduce the amount of data filtering and processing required. Measuring the chassis-axle tilt angle may avoid errors which may occur in when sensors measuring with respect to gravity are accelerated in an axis other than that which they are designed to measure. By avoiding two instances of this error (measuring with respect to gravity only for the angular position of the chassis), the disclosed telehandler and method may provide more reliable positioning of the chassis and/or improve the resistance of the telehandler to undesired changes in roll angle and/or rolling. Direct chassis-axle tilt angle measurement may be used to improve control in a manual/non-dynamic levelling mode to provide finer manual angle modulation and/or to provide an automatic function to quickly move to a pre-set axle angle.

By providing automatic transition between the first mode and the second mode the safety of the system may be improved. Maintaining the chassis-axle tilt angle when switching from the first mode to the second mode and/or maintaining the chassis-axle tilt angle when switching from the second mode to the first mode may allow for a safer transition between modes which is clearly signalled to the operator.

The disclosed telehandler and method may improve safety by providing chassis positioning system deactivation set limits of machine state (for example, vehicle speed or transmission gear).

Varying the rate of change limits of the chassis-axle tilt angle α based on additional inputs (for example sensor or operator inputs) may allow for finer control of the chassis-axle tilt angle.

What is claimed is:

1. A telehandler comprising:
    a chassis;
    an axle supporting the chassis;
    a pivotal connection between the axle and the chassis; and
    a chassis positioning system,
    wherein the pivotal connection enables rotation of the chassis relative to the axle to vary a chassis-axle tilt angle defined between a longitudinal axis of the axle and the chassis,
    wherein the chassis positioning system includes:
        a chassis angle sensor to measure an angular position of the chassis relative to gravity;
        an actuator to rotate the chassis relative to the axle at the pivotal connection;
        an axle position sensor, distinct from the chassis angle sensor, to output a value representative of a current chassis-axle tilt angle; and
        a control system configured to, in a first mode, control the actuator to control the chassis-axle tilt angle based on the measured angular position of the chassis relative to gravity from the chassis angle sensor and not based on an output of the axle position sensor, wherein the control system is configured to determine the current chassis-axle tilt angle based on the output of the axle position sensor and not based on the measured angular position of the chassis relative to gravity from the chassis angle sensor, wherein the control system is configured to, in a second mode, control the actuator to control the chassis-axle tilt angle based on the determined current chassis-axle tilt angle determined based on the output of the axle position sensor, wherein the control system is configured to selectively operate in the first mode or the second mode responsive to whether the telehandler is operating in a state that is within predefined limits for operating in the first mode or outside of the predefined limits for operating in the first mode, respectively, wherein the first mode is a chassis-gravity control mode in which the control system is configured to control the actuator to thereby control the chassis-axle tilt angle based on the measured angular position of the chassis to position the chassis at a target angular position of the chassis, and wherein the second mode is a chassis-axle control mode in which the control system is configured to control the actuator to thereby control the chassis-axle tilt angle based on the determined current chassis-axle tilt angle to position the chassis at a target chassis-axle tilt angle.

2. The telehandler as claimed in claim 1,
wherein the control system is configured to set the target angular position of the chassis based on an input from an operator.

3. The telehandler as claimed in claim 1,
wherein the control system is configured to set the target chassis-axle tilt angle based on an input from an operator.

4. The telehandler as claimed in claim 1,
wherein the axle position sensor is
an actuator extension sensor, and
wherein the control system is configured to determine the chassis-axle tilt angle based on the output of the actuator extension sensor and a known geometry of the axle and the chassis.

5. The telehandler as claimed in claim 1,
wherein a chassis-axle tilt angle range is defined in the control system, and
wherein the control system is configured to provide a warning to an operator of the telehandler when the determined current chassis-axle tilt angle is outside the chassis-axle tilt angle range.

6. The telehandler as claimed in claim 1,
wherein the actuator is an extensible member attached at a first end to the chassis and at a second end to the axle at a point spaced from the pivotal connection, and
wherein the actuator is an electro-hydraulically actuated cylinder.

7. The telehandler as claimed in claim 1, wherein the control system is configured to continuously operate in the first mode or the second mode during travel of the telehandler.

8. The telehandler as claimed in claim 1, wherein the control system is configured to pause or deactivate the chassis positioning system when a telehandler travel speed exceeds a predefined speed limit.

9. A method of controlling an angular position of a chassis of a telehandler,
the telehandler comprising:
a chassis;
an axle supporting the chassis;
a pivotal connection between the axle and the chassis; and
a chassis positioning system,
wherein the pivotal connection is configured to enable rotation of the chassis relative to the axle for varying a chassis-axle tilt angle defined between a longitudinal axis of the axle and the chassis, and
wherein the chassis positioning system includes:
a chassis angle sensor configured to measure an angular position of the chassis relative to gravity;
an actuator configured to rotate the chassis relative to the axle at the pivotal connection;
an axle position sensor, separate and distinct from the chassis angle sensor, configured to output a value representative of a current chassis-axle tilt angle; and
a controller configured to, in a first mode, control the actuator to control the chassis-axle tilt angle based on the measured angular position of the chassis from the chassis angle sensor, and in a second mode, control the actuator to control the chassis-axle tilt angle based on the current chassis-axle tilt angle from the axle position sensor; and the method comprising:
selectively measuring the angular position of the chassis relative to gravity using the chassis angle sensor or the current chassis-axle tilt angle from the axle position sensor; and
controlling the actuator to control the chassis-axle tilt angle based on only one of the measured angular position of the chassis relative to gravity or the current chassis-axle tilt angle from the axle position sensor,
wherein said controlling the actuator includes selectively operating in the first mode or the second mode responsive to whether the telehandler is operating in a state that is within predefined limits for operating in the first mode or outside of the predefined limits for operating in the first mode, respectively,
wherein the second mode is a chassis-axle control mode,
wherein said controlling the actuator to control the chassis-axle tilt angle based on the determined current chassis-axle tilt angle comprises comparing the determined current chassis-axle tilt angle to a target chassis-axle tilt angle and adjusting an extension of the actuator until the determined current chassis-axle tilt angle matches the target angular chassis-axle tilt angle,
wherein the second mode is a chassis-axle control mode, and
wherein said controlling the actuator to thereby control the chassis-axle tilt angle based on the determined current chassis-axle tilt angle comprises comparing the determined current chassis-axle tilt angle to a target chassis-axle tilt angle and adjusting an extension of the actuator until the determined current chassis-axle tilt angle matches the target angular chassis-axle tilt angle.

10. The method as claimed in claim 9,
wherein the controller is configured to set the target angular position of the chassis based on an input from an operator.

11. The method as claimed in claim 9,
wherein the controller is configured to set the target chassis-axle tilt angle based on an input from an operator.

12. The method as claimed in claim 9, further comprising providing a warning to an operator of the telehandler when the determined current chassis-axle tilt angle is outside a defined chassis-axle tilt angle range.

13. The method as claimed in claim 9, further comprising continuously operating in the first mode during travel of the telehandler.

14. The method as claimed in claim 9, further comprising pausing or deactivating the chassis positioning system when a telehandler travel speed exceeds a speed limit.

* * * * *